(12) United States Patent
Yaskoff et al.

(10) Patent No.: US 11,942,982 B2
(45) Date of Patent: Mar. 26, 2024

(54) TACTICAL/LEGACY WAVEFORM OBFUSCATION THROUGH INDEPENDENT SPREADING OVERLAY

(71) Applicant: L3Harris Technologies, Inc., Melbourne, FL (US)

(72) Inventors: Nicholas T. Yaskoff, Cottonwood Heights, UT (US); Osama S. Haddadin, Salt Lake City, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 0 days.

(21) Appl. No.: 17/300,316

(22) Filed: Jan. 11, 2022

(65) Prior Publication Data

US 2023/0223983 A1 Jul. 13, 2023

(51) Int. Cl.
| | |
|---|---|
| H04B 1/7103 | (2011.01) |
| H04B 7/185 | (2006.01) |
| H04L 5/14 | (2006.01) |
| H04L 27/14 | (2006.01) |

(52) U.S. Cl.
CPC ....... *H04B 1/7103* (2013.01); *H04B 7/18504* (2013.01); *H04L 5/14* (2013.01); *H04L 27/14* (2013.01)

(58) Field of Classification Search
CPC .... H04B 1/18504; H04B 1/707; H04B 1/709; H04B 1/7097; H04B 1/7103; H04B 2001/70724; H04B 2001/7152; H04L 5/14; H04L 27/14
USPC ......... 375/140–144, 146–148, 150; 370/320, 370/335, 342
See application file for complete search history.

(56) References Cited

U.S. PATENT DOCUMENTS

| | | | | |
|---|---|---|---|---|
| 5,841,808 A | * | 11/1998 | Rizzo | H04B 1/7085 375/150 |
| 5,859,842 A | | 1/1999 | Scott | |
| 6,731,622 B1 | * | 5/2004 | Frank | H04B 1/70754 455/501 |
| 10,491,261 B1 | * | 11/2019 | Al-Eidan | H04L 27/2003 |
| 2009/0245327 A1 | | 10/2009 | Michaels | |
| 2011/0002364 A1 | * | 1/2011 | Michaels | H04J 13/10 375/141 |
| 2013/0309975 A1 | * | 11/2013 | Kpodzo | H04B 17/336 455/63.1 |
| 2015/0195670 A1 | * | 7/2015 | Agee | H04B 1/7103 375/144 |

(Continued)

FOREIGN PATENT DOCUMENTS

| | | |
|---|---|---|
| EP | 2081304 A1 | 7/2009 |
| EP | 2106032 A1 | 9/2009 |

(Continued)

OTHER PUBLICATIONS

European Search Report received for EP Patent Application No. 23151161.9, dated Sep. 4, 2023, 12 pages.

*Primary Examiner* — Young T. Tse
(74) *Attorney, Agent, or Firm* — Workman Nydegger (57) ABSTRACT

Communicating using spread spectrum. A legacy RF signal is intercepted from a legacy radio. Spread spectrum processing is performed on the legacy RF signal to create a spread signal. The spread signal is transmitted to a receiver, whereafter the spread signal is de-spread to recover the legacy RF signal.

19 Claims, 10 Drawing Sheets

(56) References Cited

U.S. PATENT DOCUMENTS

2015/0381112 A1* 12/2015 Wang .................... H04B 1/1036
455/78
2016/0072546 A1* 3/2016 Floch ...................... G01S 19/02
375/150
2020/0313719 A1* 10/2020 Blanchard ............ H04B 17/336

FOREIGN PATENT DOCUMENTS

| WO | 2008/009982 A2 | 1/2008 |
| WO | 2009/149107 A1 | 12/2009 |
| WO | 2016/206721 A1 | 12/2016 |
| WO | 2021/250385 A1 | 12/2021 |

* cited by examiner

TACTICAL/LEGACY WAVEFORM OBFUSCATION THROUGH INDEPENDENT SPREADING OVERLAY

BACKGROUND

Background and Relevant Art

Various entities, including military entities, are interested in highly protected, covert communications for contested anti-access/area denial (A2/AD) environments. This is sometimes achieved with the introduction of new communication waveforms. However, the cost of introducing and deploying new waveforms and radios to all users and platforms is typically prohibitive. Furthermore, entities are often interested in continuing the use of legacy waveforms, systems, and radios to achieve mission specific tasks. Thus, while designing a new waveform from scratch yields better performance, it may prohibit the use of existing legacy waveforms and communication systems.

Further, in one specific example, 5G offers many benefits for tactical/military use, and it is expected to spread very quickly among the user community. One of the risks associated with 5G is that it is detectable, jammable and exploitable. Enemy equipment can easily jam 5G emissions, disrupting its use. With some sophistication, the enemy can detect 5G emissions, determine the location of emitters with great accuracy, and track traffic patterns. This can result in serious harm to various users and missions. Since users and missions are often the target of adversarial operations, protecting them is as important as protecting data through encryption.

New wireless communication systems for tactical and/or military use, including protected and resilient communications, are traditionally designed as part of a lengthy and costly new development and deployment cycle. This covers system design, prototype build, low-rate initial production, user trials, production build, and full deployment. To improve time to deployment, it is more attractive to augment 5G with new overlay capability that enhances its protection and resiliency for military use without sacrificing the 5G technology or performance.

To provide waveform obfuscation or low probability of interference/low probability of detection/anti-jam (LPI/LPD/AJ) capabilities, industry has followed the path of new waveform design or major modifications to legacy military waveforms. Neither approach takes advantage of the technological advances and dollars spent making 5G a reality, nor are these approaches compatible with existing communication waveforms and equipment. While designing a new waveform from scratch yields better LPI/LPD/AJ performance, it may prohibit the use of existing standards, base stations, infrastructure, and end-user equipment.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a communication environment. The method includes acts for communicating using spread spectrum. The method includes intercepting a legacy RF signal from a legacy radio. Spread spectrum processing is performed on the legacy RF signal to create a spread signal. The spread signal is transmitted to a receiver, whereafter the spread signal is de-spread to recover the legacy RF signal.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Embodiments illustrated herein implement an overlay spread spectrum device applied between a legacy transmitter (such as a 5G and/or Code Division Multiple Access (CDMA) transmitter) and a legacy receiver. This device takes the legacy Radio Frequency (RF) waveform as input, applies spreading techniques (such as direct sequence, frequency hop, chaotic, or other spreading), and then retransmit the waveform as a spread signal. Note that legacy, as used herein simply refers to signals and waveforms transmitted from a different communications device that can be received and processed by spread spectrum devices and/or modules to produce a spread signal. Often, legacy signals and waveforms will have vulnerabilities with respect to detection, interception, jamming, geolocation, etc., that can be addressed by creating the spread signal. A corresponding mission module at the receiving end reverses the spreading (i.e., de-spreading the waveform) to re-create the legacy waveform. In some embodiments, a so-called Bolt-On Spread Spectrum (BOSS) module (whether at the transmitter or the receiver) can be a plug-in addition to legacy end-user equipment. The BOSS module does not require redesign of the legacy standard or legacy equipment and does not affect wireless link performance. The BOSS module can be combined with highly directional mid-band systems for Low Probability of Interception/Detection (LPI/LPD) and Anti-Jam (AJ). Once applied to legacy waveforms, the BOSS module spreads power across wider bandwidths below the noise floor making it more difficult to detect, jam or geo-locate transmitters. Examples of this are illustrated in FIG. 1, which will be illustrated in more detail below.

Figure 1:
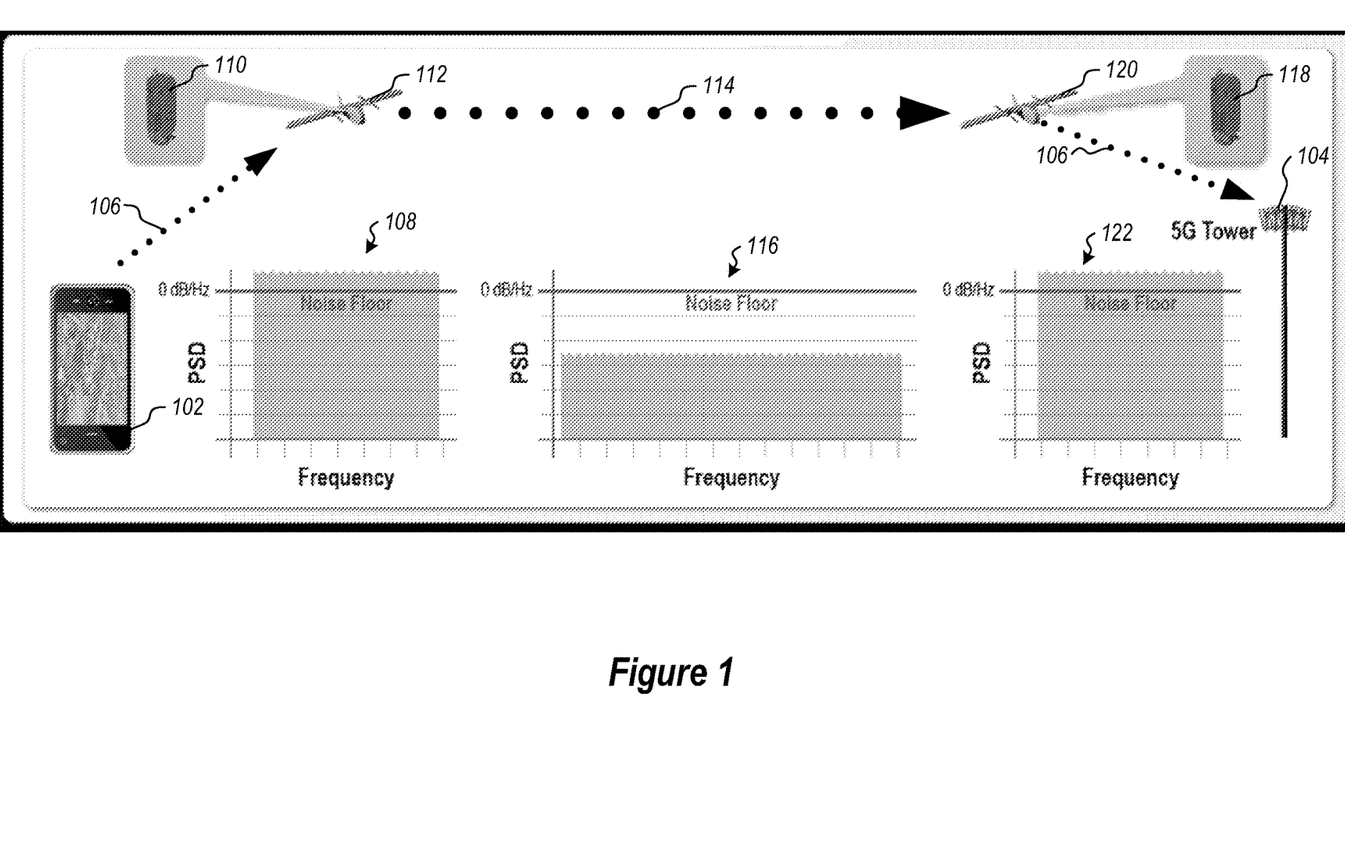
FIG. 1 illustrates a legacy transmitter and legacy receiver using spread spectrum relay components.

In particular, FIG. 1 illustrates a legacy transmitter 102 and a legacy receiver 104. In this example, the legacy transmitter 102 is shown as a cellular telephone with 5G capabilities. The legacy receiver 104 is shown as a 5G cell tower. While a separate transmitter and receiver are shown in this example, it should be appreciated that most implementations will include nodes having both transmit and receive functionality. Thus, for example, the cellular telephone illustrated could be either a transmitter or receiver. Similarly, the cell tower illustrated could be a transmitter or receiver.

FIG. 1 illustrates that the legacy transmitter transmits a legacy RF signal 106. For example, the legacy RF signal 106 may be a signal transmitted in 5G. In some embodiments, as illustrated at 108, the legacy RF signal 106 will often be transmitted with a power spectral density that causes the legacy RF signal 106 to be transmitted in a fashion whereby the legacy RF signal 106 exists above a noise floor. The noise floor is generally understood to be a level of background noise in an environment. Note that in some embodiments, the legacy transmitter 102 can transmit the legacy RF signal 106 to other nodes that are proximate the legacy transmitter 102. Thus, for example, in some embodiments a smaller network of devices that are within some predetermined proximity to each other may be able to communicate using signals that have not been spread, such as the legacy RF signal 106.

FIG. 1 illustrates that a spread spectrum module 110 is deployed on a relay platform 112. In this example, the relay platform 112 is illustrated as a drone which carries the spread spectrum module 110. The spread spectrum module 110 intercepts the legacy RF signal 106 and performs spreading operations on the legacy signal 106 to produce a spread signal 114. As illustrated in FIG. 1 at 116, the spread signal 116 is spread such that it exhibits a power spectral density that causes the spread signal 114 to be below the noise floor. In this way, the legacy RF signal 106 can be spread in a fashion to produce the spread signal 114 where the spread signal 114 exhibits LPI/LPD/AJ characteristics. Note that this method of altering the original (or legacy) signal can be implemented in a fashion that does not need to know data or data format being transmitted. It can be implemented in a fashion that does not need to know error correction or modulation types of the original legacy communication signal. This process can be implemented in a fashion that is agnostic to communication or signal formats.

As illustrated in FIG. 1, the spread signal 114 is transmitted to a spread spectrum module 118 included on a relay platform 120. Again, as illustrated in this example, the relay platform 120 is a drone that is able to receive communications from the relay platform 112. FIG. 1 illustrates that the spread spectrum module 118 performs de-spreading operations to recover the legacy RF signal 106 which is then transmitted to the legacy receiver 104. For example, de-spreading can be performed by applying multiply and accumulate operations to identify acquisition markers, such as a pilot sequence, and then sweep pseudo-random noise code on incoming signals as appropriate.

FIG. 1 further illustrates at 122 that de-spreading performed by the spread spectrum module 118 causes the recovered legacy RF signal 106 to again be above the noise floor. Note that in some embodiments, the legacy receiver 104 may be located in an area where there is less concern about detection, interception, and/or jamming of the legacy RF signal 106.

Embodiments may support full duplex scenarios where individual devices are capable of functioning in both send and receive capacities. Thus, for example, while the spread spectrum module 110 is illustrated as a spreading module and the spread spectrum module 118 is illustrated as a de-spreading module, it should be appreciated that often the various spread spectrum modules will have functionality for both spreading and de-spreading. Some embodiments may include separate components for accomplishing this functionality. However, in other embodiments, various portions of hardware including pseudo-random noise (PN) generators and other components can be used for both spreading and de-spreading functionality.

Thus, FIG. 1 illustrates a relay system. In particular, legacy transmissions over-the-air between the end-user and the relay drone are standard legacy transmissions, which is then spread generating a legacy-spread spectrum signal from the first drone to the second drone. The second drone re-creates and retransmits the standard legacy waveform to the end tower. The over-the-air section between the two drones has an obfuscated waveform with LPD, LPI, AJ, and Low Probability of Geo-location (LPG) features. This greatly reduces the ability for equipment observing the emissions to detect that the two drones are communicating and track their traffic patterns. Note the mission spread spectrum module inside the drone is not demodulating legacy communications and re-modulating data into another waveform. It is only processing the sampled legacy RF by spreading, spectrum re-allocation, acquisition marker handing (e.g., inserting pilot acquisition codes, coordinating time stamps, providing signals on alternate command channels, etc.), and/or other signal processing. That is, spreading is applied to samples of a legacy waveform after the legacy waveform has been modulated. Thus, in some embodiments, spreading is not applied to information bits or symbols in the legacy waveform, but rather samples of the modulated legacy waveform itself are spread.

Similarly, receiver acquisition and tracking of pseudo-random noise codes using a pilot waveform or other acquisition marker combined with a legacy waveform can be used for de-spreading. Embodiments use an external channel for acquisition and pseudo-random noise alignment without using data information carried by the legacy waveform or relying on demodulation of the legacy waveform. That is, the spread waveform is de-spread to obtain the legacy waveform, which is then demodulated to obtain data in the legacy signal of interest. Demodulation occurs subsequent to de-spreading such that demodulated data is not required for de-spreading.

Figure 2A:
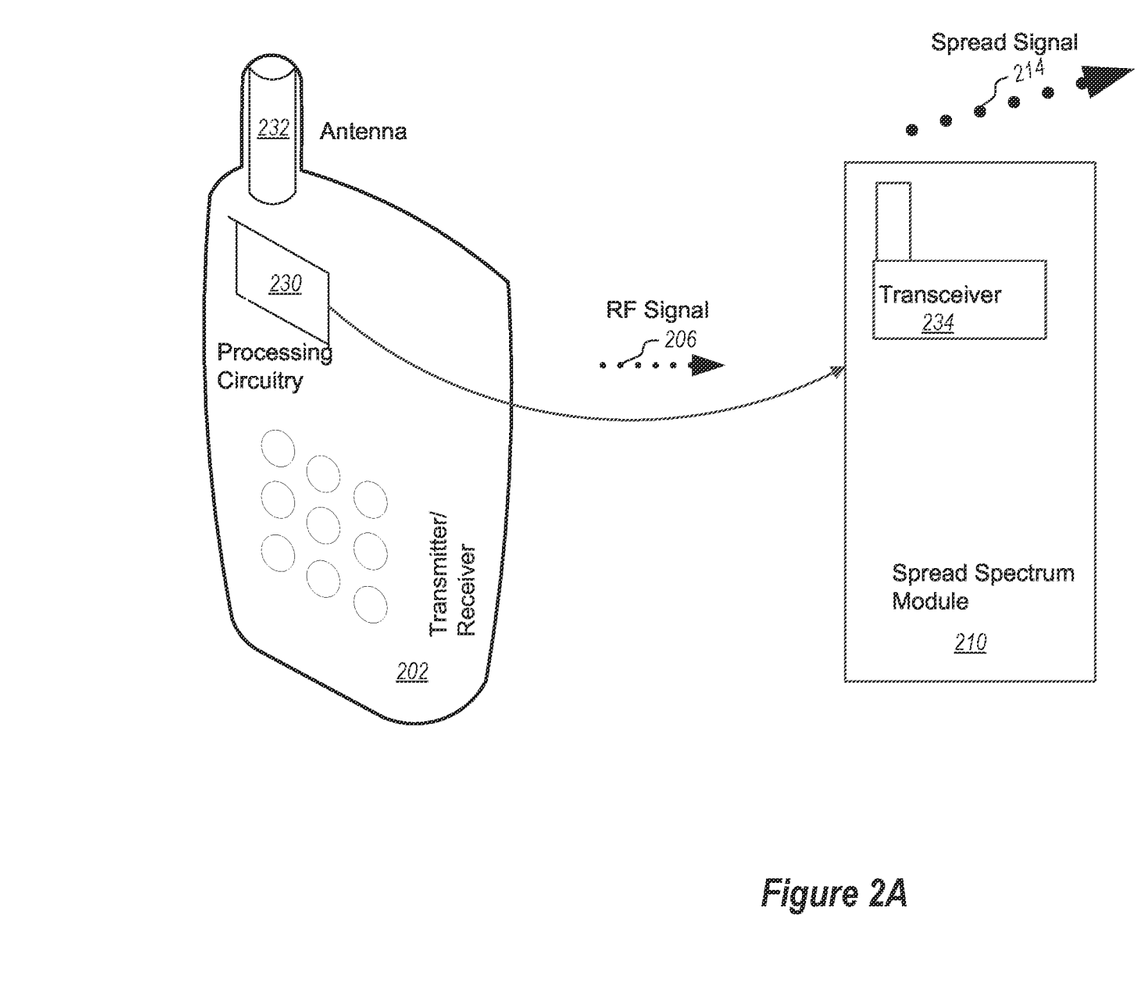
FIG. 2A illustrates a transmitter/receiver having a spread spectrum module coupled to the transmitter/receiver, where the spread spectrum module includes a transceiver.
Figure 2B:
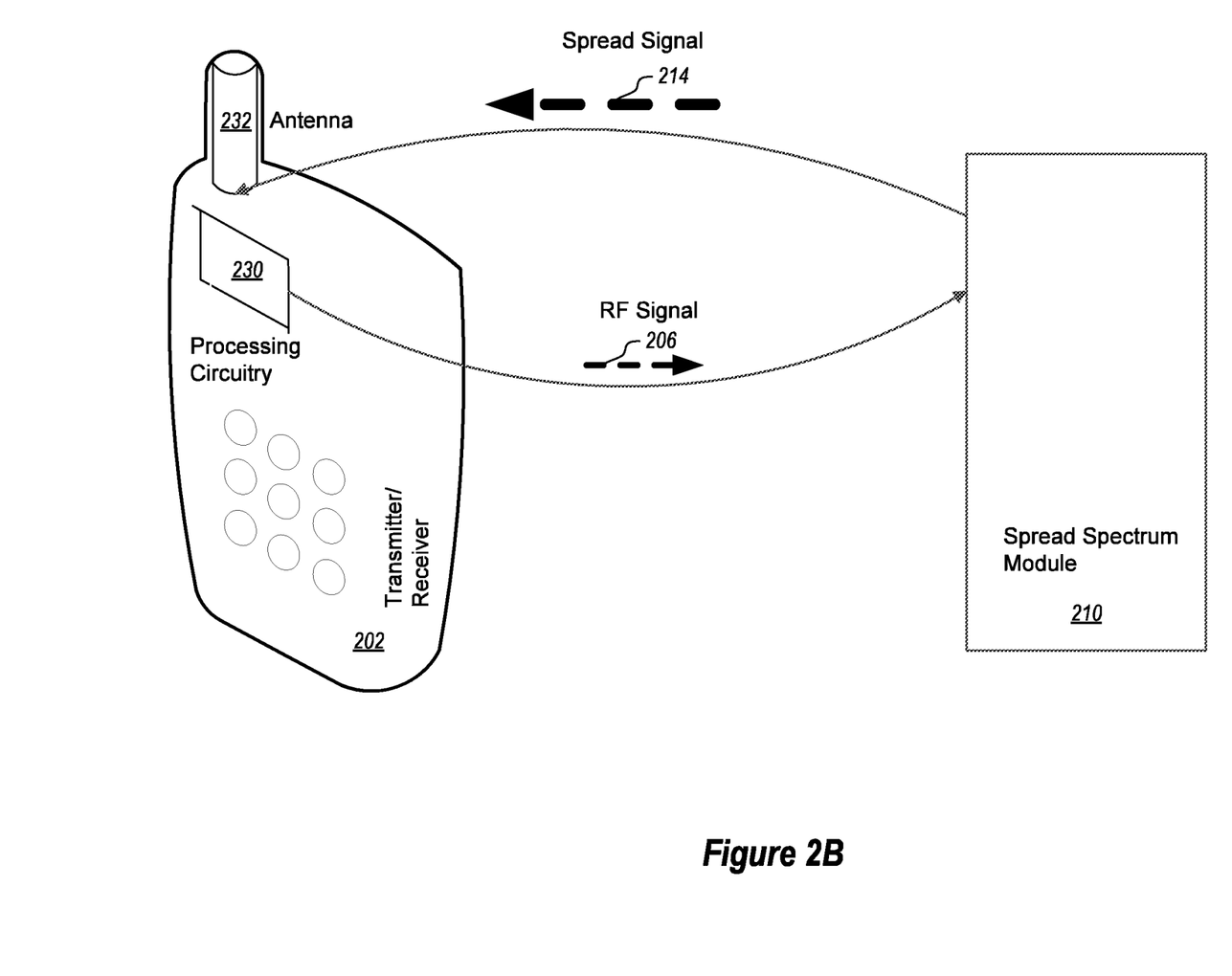
FIG. 2B illustrates a transmitter/receiver having a spread spectrum module coupled to the transmitter/receiver.

FIGS. 2A and 2B illustrate alternate examples where a spread spectrum module 210 is coupled in a wired, wireless, or other tethered fashion to a transmitter/receiver 202, which is illustrated as a handheld radio. In this example, the spread spectrum module 210 is coupled to signal processing circuitry 230. The signal processing circuitry 230 includes various components such as modulators, filters, digital to analog converters, analog to digital converters, and the like configured to generate the legacy RF signal 206. Ordinarily, the legacy RF signal 206 produced by the processing circuitry would be provided to the antenna 232 where it would be propagated as a wireless signal, such as is illustrated by the legacy transmitter 102 illustrated in FIG. 1. However, in some embodiments illustrated herein, the legacy RF signal 206 is provided to the spread spectrum module 210, where the legacy RF signal is spread to form the spread signal 214. The spread signal 214 is then transmitted by a transceiver 234 in the spread spectrum module 210.

In an alternative embodiment as illustrated in FIG. 2B, the spread signal 214 is provided to the antenna 232 (and potentially other related communication hardware) where it is propagated as a wireless signal. Thus, in this example, the legacy RF signal 206 is not subject to being used for interception, detection, geolocation, or subject to being jammed. Rather, only the spread signal 214 is transmitted over the air, and due to it being characteristically below the noise floor, the spread signal 214 can likely not be used for interception, detection, geolocation, and is likely not subject to being jammed.

Embodiments may be implemented using a mission module that contains the forward (spreading) and inverse (de-spreading) processing applied to legacy RF signals at RF and not on the bits or symbols. The application of spread spectrum as an overlay can be reversed without altering the structure, format or performance of legacy RF waveforms so all the benefits that are embedded within legacy technology (including, e.g., 5G technology) are maintained. A given mission module (such as the spread spectrum module 110 or 118) does not need to contain any information about legacy communications other than the frequency band(s).

Figure 3:
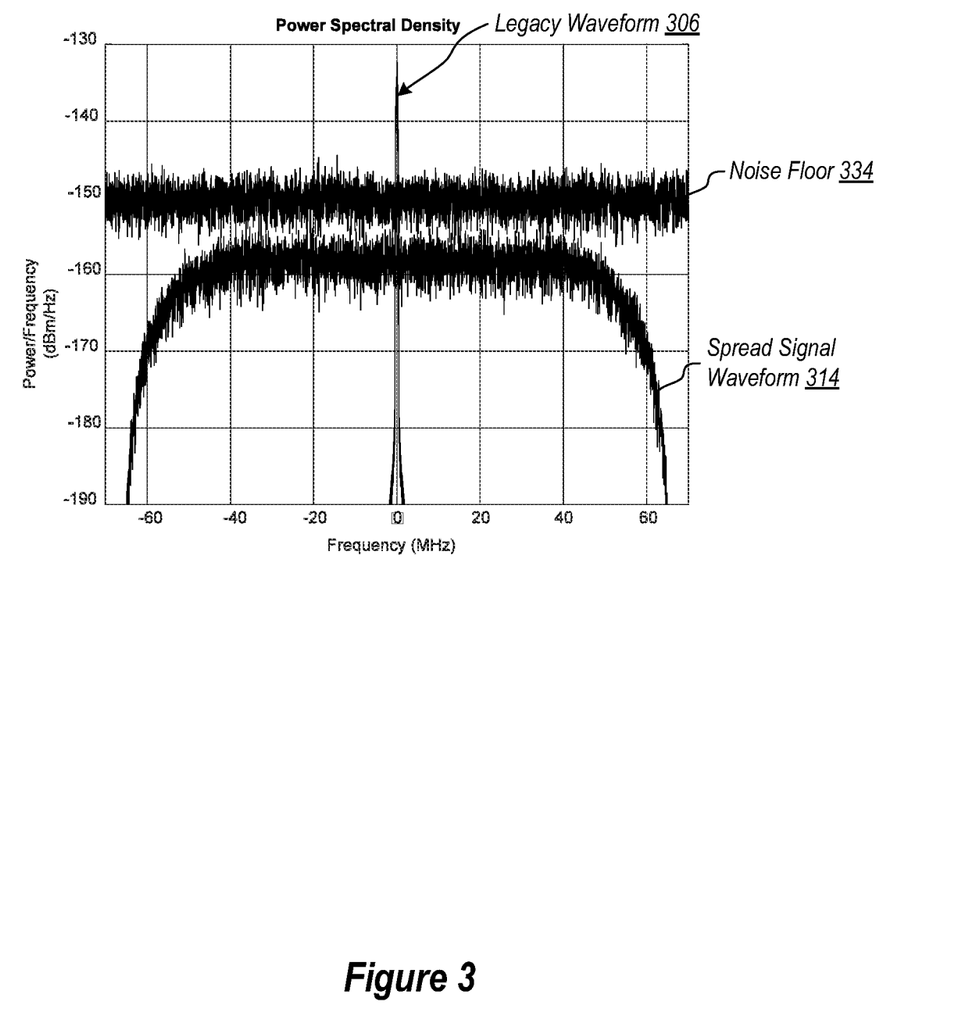
FIG. 3 illustrates a frequency domain representation of a legacy waveform, a noise floor, and a spread waveform formed from the legacy waveform.
Figure 4:
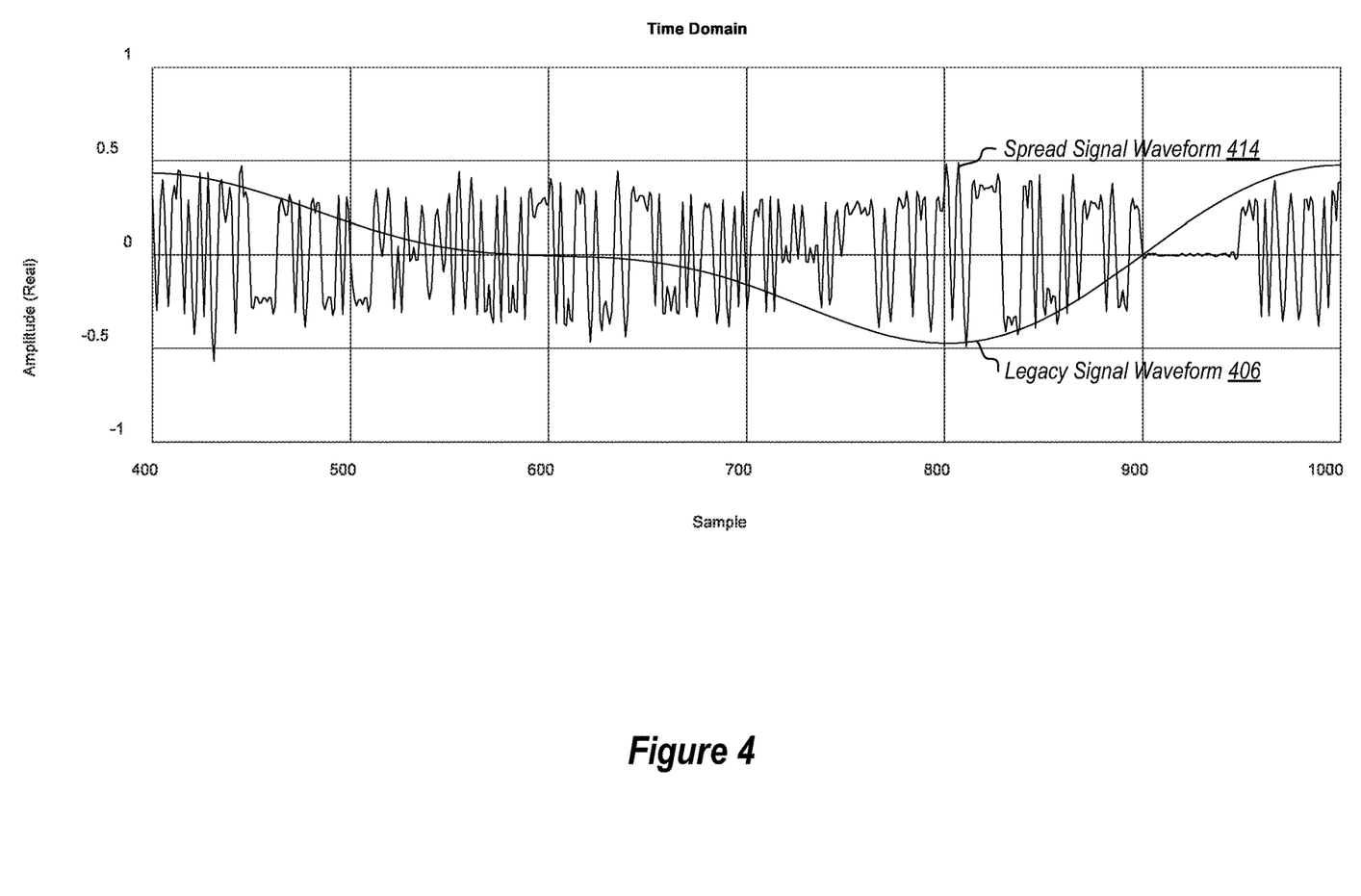
FIG. 4 illustrates a time domain representation of a legacy waveform and a spread waveform for the legacy waveform.

Attention is now directed to FIGS. 3 and 4, which illustrate frequency and time domain graphs, respectively, showing legacy signal waveforms, spread signal waveforms, and a representation of the noise floor.

For example, FIG. 3 illustrates a frequency domain representation where signals are graphed by power spectral density with respect to frequency. In particular, FIG. 3 illustrates a legacy waveform 306, a spread signal waveform 314 and a noise floor 334. In this example, the legacy waveform 306 has significant portions that exceed the noise floor 334 in spectral power density at certain frequencies. In contrast, the spread signal waveform 314 formed from the legacy waveform 306 exists below the noise floor 334 at all relevant frequencies.

FIG. 4 illustrates a time domain plot. FIG. 4 illustrates a time domain representation of the legacy signal waveform 406 and a corresponding time domain representation of the spread signal waveform 414. In this example, the legacy signal waveform 406 is further modulated using a pseudo-random noise waveform (as will be illustrated in more detail below) to create the spread signal waveform 414.

Note that FIG. 4 illustrates the spread signal waveform 414 having a variable waveform envelope. Some embodiments may be implemented using outphasing to cause spread signal waveforms to have constant envelopes. In particular, embodiments may employ outphasing to mitigate the increase of peak-to-average-power ratio (PAPR) and to eliminate any time variations in the waveform envelope. Outphasing typically involves deconstructing a variable envelope signal into two constant envelope signals, that when recombined produce the original variable envelope signal. Some embodiments may combine outphased signals at the transmitter and/or over the air.

As noted above, outphasing breaks a variable envelope waveform into two constant-envelope components, where those two components are then sent through two power amplifiers. After amplification, the two components are combined to recover the original (still spread, but now amplified) waveform. Thus, in some embodiments, outphasing is implemented on a single (2-channel) transmitter with two power amplifiers and antennas (each transmitting one component of the outphased waveform), these combine in the air, such that they are combined at the receiver.

Alternatively, outphasing can be implemented using two independent but synchronous transceivers so that they add up coherently at the receiving antenna thus optimizing size, weight and power for radio equipment. Further, such embodiments can be used to further hinder detection operations being performed by adversarial entities.

In yet another alternative example, outphasing recombination is implemented by combining the two constant-envelope components after they are passed through the two power amplifiers, (and not in air).

Figure 5A:
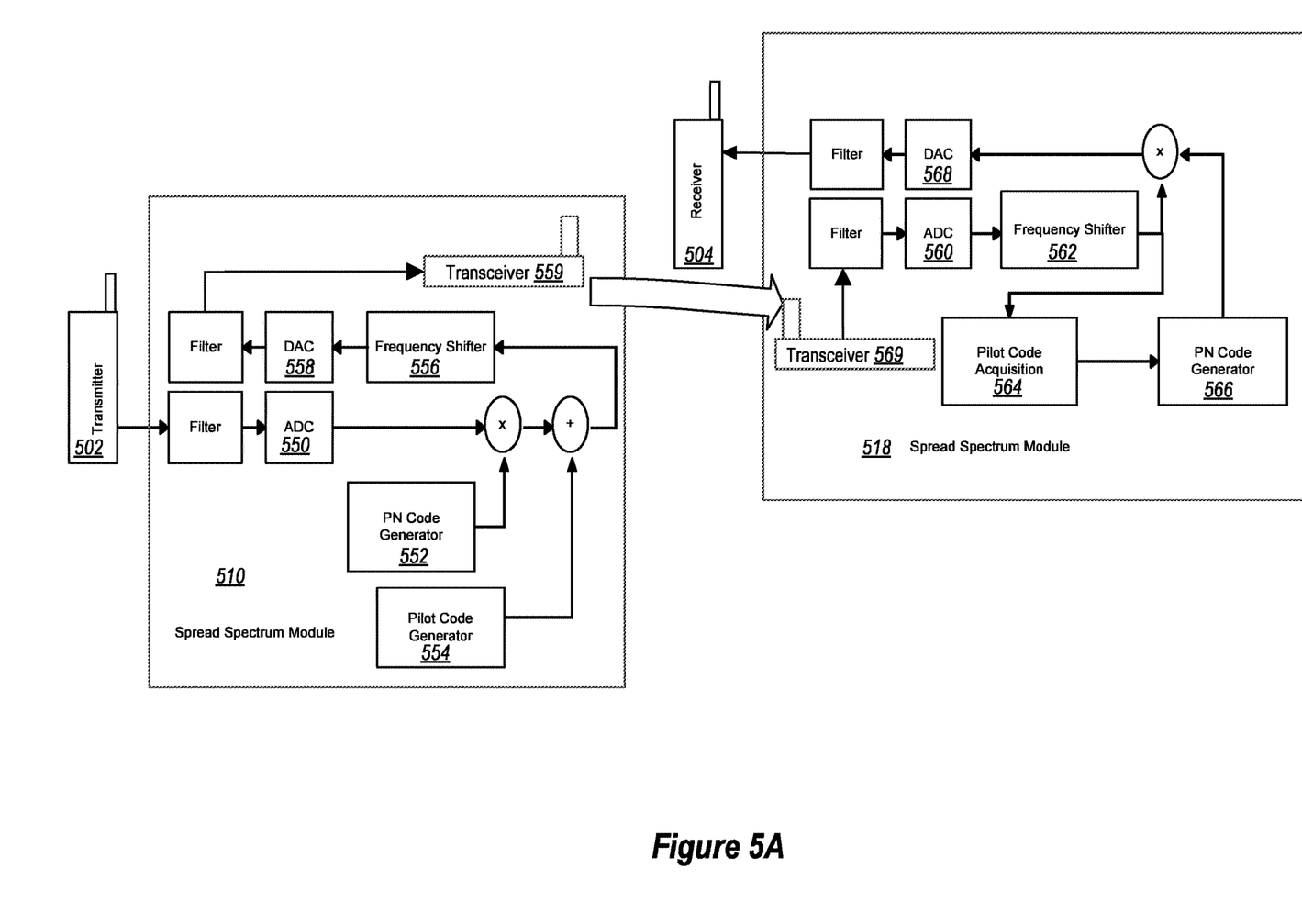
FIG. 5A illustrates block diagrams of a transmitter and a receiver and associated spread spectrum modules using transceivers in the spread spectrum modules.
Figure 5B:
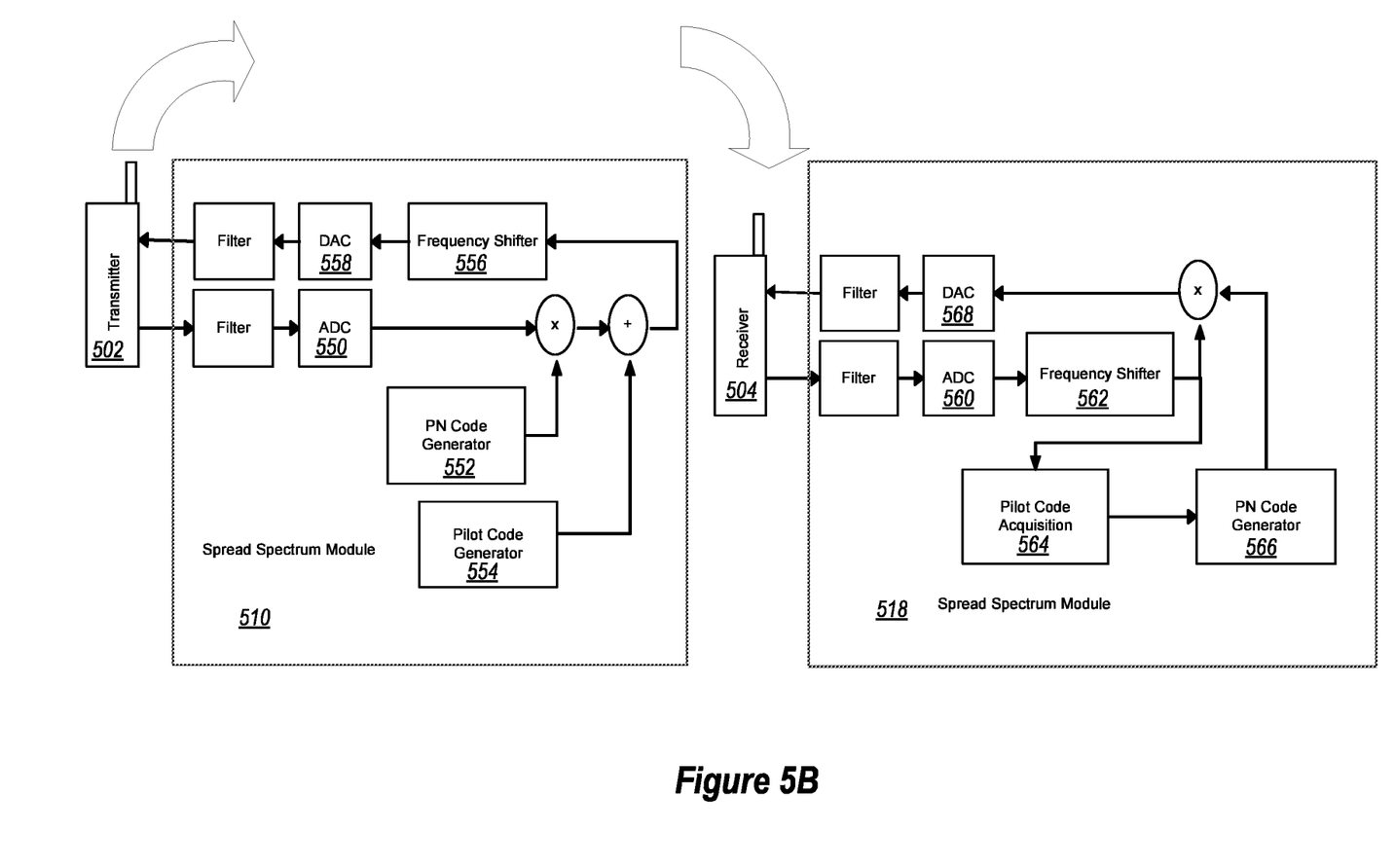
FIG. 5B illustrates block diagrams of a transmitter and a receiver and associated spread spectrum modules using transceivers in the transmitter and receiver.
Figure 6:
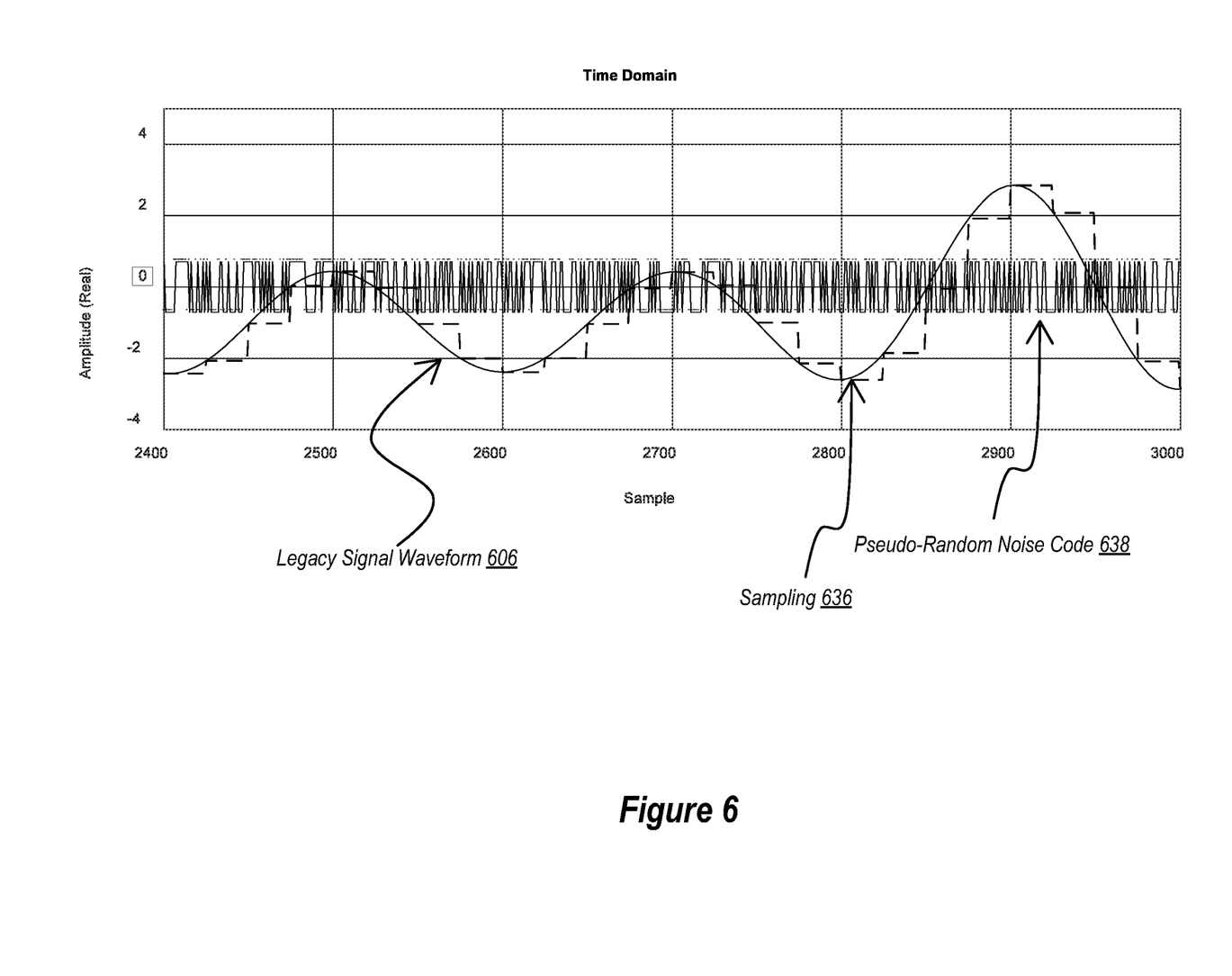
FIG. 6 illustrates a time domain representation of a legacy waveform, sampling of the legacy waveform, and a pseudo-random noise waveform used to spread the legacy waveform.

Additional details are now illustrated with reference to FIGS. 5A, 5B, and 6, where FIGS. 5A and 5B illustrate block diagrams of a transmitter 502 and a receiver 504 and associated spread spectrum modules 510 and 518 respectively, while FIG. 6 illustrates a legacy signal waveform 606, sampling 636 of the legacy signal waveform 606, and a pseudo-random noise code 638 used to spread the legacy signal waveform 606.

FIGS. 5A and 5B shows a block diagram of the processing inside the spread spectrum module 510 for spreading functionality when coupled to the legacy transmitter 502. When the spread spectrum module 510 is wireless (such as is illustrated in FIG. 1), it would include antennas and Radio Frequency Equipment (RFEs) to receive legacy communications. Alternatively the legacy communications can be received over a wired signal path.

FIG. 6 illustrates a legacy waveform 606 that is sampled as illustrated by the sampling 638. Sampling can be performed by the analog to digital converter 550 illustrated in FIGS. 5A and 5B sampling the legacy waveform. Further, as illustrated in FIGS. 5A and 5B, the spread spectrum module 510 uses a pseudo noise code generator 552 to spread the legacy signal waveform 606. In some embodiments, spreading may make use of a pseudo-random noise sequence.

Additionally, a pilot code generator 554 is used to add a pilot code, beacon, or other acquisition marker which can be used for alignment by the spread spectrum module 518 associated with the receiver 504, as will be discussed in more detail below. Note that in some embodiments, acquisition markers do not necessarily need to be added as the spread spectrum modules 510 and 518 may include other functionality for acquisition such as through the use of various clocks or other timing circuitry, or other synchronization means.

FIGS. 5A and 5B further illustrates that a frequency shifter 556 can be used to move the spread signal to a different, non-overlapping carrier frequency, or otherwise reallocate spectrum, used for the spread signal. FIGS. 5A and 5B further illustrates that the spread signal can be passed through a digital to analog converter 558 to create a signal that can be propagated by a transceiver 559. Alternatively, the signal can be sent to the transmitter (if the transmitter includes functionality to receive the signal) as illustrated in FIG. 5B. In either case, the transceiver 559 or the output of the transmitter 502 are used to send the spread signal. In some embodiments, this may include sending the spread signal to a transceiver 569 in a spread spectrum module 518 associated with the receiver 504 as illustrated in FIG. 5A. Alternatively, as illustrated in FIG. 5B, the spread signal is sent directly to the receiver 504 where it can be passed to the spread spectrum module 518 for processing.

In some embodiments, a pilot code or other acquisition marker is used to determine timing within the pseudo-random noise sequence and time tracking/alignment at the receiver 504. In some embodiments, the waveform spreading pseudo-random noise sequence is implemented as a featureless sequence that does not repeat, while the pilot code repeats often but is maintained at lower power so as not to jeopardize low probability of detection. Spectrum re-allocation (frequency shift) functionality implemented by the frequency shifter 556 is shown as a digital implementation (by virtue of being included prior to the digital to analog converter 558), but this functionality can be split between digital and analog processing to extend the frequency agility range. Available bands for use by spread spectrum modules (e.g., leveraging military bands) can be made known dynamically using external sensing and Dynamic Spectrum Access (DSA) software or at pre-mission planning through existing spectrum allocation tools and procedures.

FIGS. 5A and 5B further shows a similar functional block diagram for the receive processing at the receiver 504 and its associated spread spectrum module 518. In this example, the processing illustrated in the spread spectrum module 518 searches for a pilot symbol added by the pilot code generator 554 (or other acquisition marker) to determine a position in the waveform spreading code to align the code accordingly for de-spreading. Thus, in the example illustrated in FIGS. 5A and 5B, a received spread spectrum signal (received either directly at the spread spectrum module 518 as illustrated in FIG. 5A, or received at the receiver 504 and provided to the spread spectrum module 518 as illustrated in FIG. 5B) is filtered and then sampled by the analog to digital converter 560, shifted back to the expected legacy band by the frequency shifter 562, acquiring timing is acquired using a pilot code acquisition detector 564 to search for the pilot code, and de-spreading using the same pseudo-random noise code, e.g., by using a complex conjugate of the pseudo-random noise code, used at the transmitter spread spectrum module 510, where the pseudo-random noise code is generated at the receiver spread spectrum module at the pseudo-random noise generator 566. The de-spread waveform is converted to an analog signal by the digital to analog converter 568, and coupled back into the receive path of the legacy radio receiver 504. Acquisition and tracking using pilot code compensates for oscillator offsets and Doppler in highly mobile applications and can be made to exceed the requirements for legacy radios.

In typical embodiments, neither the spreading nor the de-spreading uses any legacy waveform information. The hardware does not need to be designed for required center frequencies, bandwidths and power levels, as is the case for transmitting legacy signals over the air.

In some embodiments, coupling into a legacy radio such as the transmitter 502 and/or the receiver 504, is performed with an analog coupler before a power amplifier. In some embodiments, the analog coupler may include a connector form factor specifically for military use. For example, as illustrated in FIG. 2B, a power amplifier may be associated with the antenna 232, where the power amplifier is coupled to an analog connector to which the spread spectrum module 210 can be connected.

Various features that can be implemented are now discussed.

In some embodiments, a waveform spreading/de-spreading code may use a very long, non-repeating pseudo-random noise sequence that is difficult to detect. This sequence does not exhibit features or repeating patterns that would appear using correlation. As noted above, this is useful to minimize detection of the signal.

In some embodiments, the pilot code design and acquisition are combined with the waveform spreading sequence and used to synchronize and track transmitters in the presence of Doppler and various offsets imposed by the communication systems and channel.

As illustrated above, a frequency shifters 556 and 562 can be used for spectrum re-allocation. Spectrum re-allocation to military bands, for example, can occur dynamically using dynamic spectrum allocation, or during pre-mission planning following military spectrum allocation tools and procedures.

Embodiments may be implemented where bolt-on spread spectrum can incorporate various notching and interference cancellation algorithms at the receiving end to eliminate strong jammers before de-spreading to produce legacy communications. Thus, for example, an adversarial entity may attempt to introduce a jammer between the transmitter 502 and the receiver 504 with a power spectral density consistent with a legacy waveform, such as the waveform 306 illustrated in FIG. 3. This may be done, for example, based on the adversarial entity believing that that bandwidth is the bandwidth where signals of interest reside. However, by using the bolt-on spread spectrum techniques illustrated herein, and in some embodiments, in conjunction with notch filtering, the jammer can be rendered ineffective. In particular, the de-spreading process performed at the receiver 504 tends to concentrate the signal of interest in a desired power spectral density while actually spreading the jammer waveform below the noise flower.

However, simply relying on the de-spreader to eliminate and/or reduce the effects of the jammer may nonetheless leave portions of the jammer in a state that allow for interference with the signal of interest when de-spread. Thus, some embodiments can notch out the jammer using a notch filter and/or other narrow frequency band filtering prior to de-spreading. This results in an even further improved elimination and/or reduction of the jammer waveform by both notching out portions of the jamming waveform and spreading any remaining portion as part of the de-spreading process.

Various benefits can be obtained using various embodiments of the invention. For example, depending on the legacy mode of communication in use, spreading gain can increase power for a received signal. The benefit is dependent on the legacy mode in use and the bandwidth available for the spread spectrum waveform. For example, a 1-MHz legacy waveform frequency spread over 20 MHz of bandwidth confers a 13 dB benefit. In another example, for a 1-MHz legacy waveform spread over 100 MHz, a 20 dB benefit is conferred.

Another benefit relates to the fact that acquisition and tracking using a pilot code provides tolerance to Doppler (i.e., vehicle and channel dynamics) beyond those provided by the legacy equipment. This allows the legacy system and bolt-on spread spectrum system to operate on board of vehicles moving in excess of 3000 knots.

Another benefit relates to the fact that spreading and interference cancellation provides legacy radio front-end protection and increased dynamic range to continue operation in the presence of jammers. Interference cancellation provides, for example, up to 20 dB benefit for wideband interference and up to 30 dB for narrowband interference.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 7:
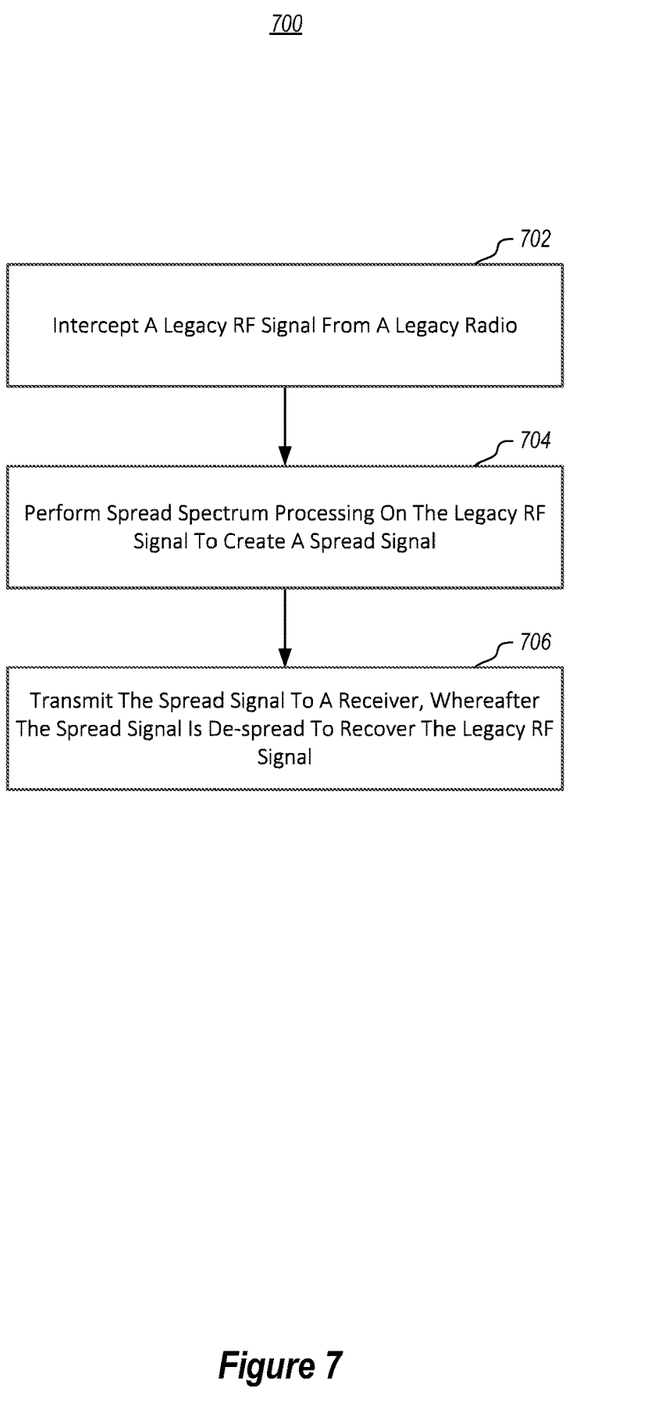
FIG. 7 illustrates a method of communicating using spread spectrum.

Referring now to FIG. 7, a method 700 is illustrated. The method 700 includes acts for communicating using spread spectrum. The method 700 includes intercepting a legacy RF signal from a legacy radio (act 702). For example, in FIG. 1, a legacy RF signal 106 is intercepted by the spread spectrum module 110. In FIGS. 2A and 2B, a legacy RF signal 206 is intercepted by the spread spectrum module 210. In FIGS. 5A and 5B, a legacy RF signal is intercepted by the spread spectrum module 510.

The method 700 further includes performing spread spectrum processing on the legacy RF signal to create a spread signal (act 704). For example, FIG. 3 illustrates a legacy waveform 306 spread to a spread signal waveform 314.

The method 700 further includes transmitting the spread signal to a receiver, whereafter the spread signal is de-spread to recover the legacy RF signal (act 706). FIG. 1 illustrates the spread signal 114 is transmitted to the spread spectrum module 118, which de-spreads the spread signal 114 to recover the legacy RF signal 106, which is then further transmitted to the receiver 104. Thus, in this example, the spread spectrum module 118 is one receiver that receives the spread signal 114, while the receiver 104 is a second receiver that receives the legacy RF signal 104.

The method 700 may be practiced where intercepting the legacy RF signal comprises intercepting the legacy RF signal, in a wired fashion, at a device physically attached to the legacy radio.

The method 700 may be practiced where intercepting the legacy RF signal comprises intercepting the legacy RF signal at a device distant the legacy radio by intercepting the legacy RF signal over the air. An example of this is illustrated in FIG. 1 and the description of that figure discussed above.

The method 700 may be practiced where performing spread spectrum processing on the legacy RF signal is performed to cause the spread signal to be below a predetermined noise floor. An example of this is illustrated in FIG. 3, where the spread signal waveform 314 is below the noise floor 334.

The method 700 may be practiced where performing spread spectrum processing on the legacy RF signal is performed to cause the spread signal to be suitable for use in a CDMA system.

The method 700 may further include adding an acquisition marker to the spread signal. Thus, for example, a low power, pseudo-random noise code can be added to the spread waveform to facilitate acquisition, alignment, and tracking of the spread signal at a receiver to facilitate de-spreading.

The method 700 may be practiced where the acts are performed such that communications in the legacy RF signal are sent in the spread signal with the spread signal originating at the legacy radio and persisting to the receiver. An example of this is illustrated in FIGS. 5A and 5B, where legacy RF signals and spread signals are both handled at the transmitter 502 and where the receiver 504 handles both legacy RF signals and spread signals, each with assistance of spread spectrum modules 510 and 518 respectively.

The method 700 may be practiced where the acts are performed such that communications in the legacy RF signal are sent such that devices proximate the legacy radio receive the legacy RF signal, but where other devices receive the communications by receiving the spread signal. Examples of this are illustrated in FIG. 1 where communications proximate the transmitter 102 can be performed using only the legacy RF signal to other devices (not shown), but where communication from the transmitter 102 to other locations, such as the location of the receiver 104, are accomplished using the spread signal 114. Thus, embodiments may be such that communications intended for devices in a predetermined geographical area are performed using legacy RF communications, but communications intended to devices outside that predetermined geographical area are performed using spread signals formed using the legacy RF communications.

The method 700 may further include performing outphasing on the spread signal.

The method 700 may further include performing frequency shifting on the spread signal. For example, this may be done to move the spread signal to a different portion of a frequency band.

Figure 8:
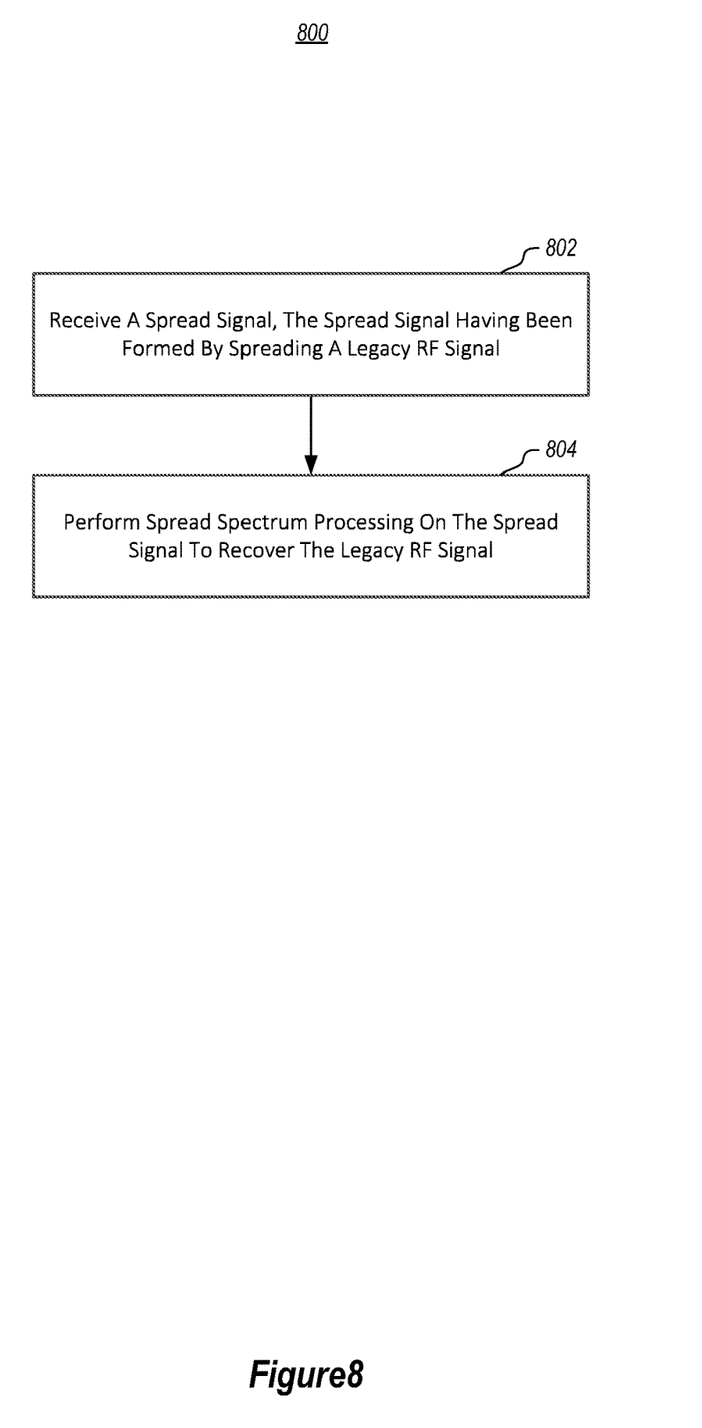
FIG. 8 illustrates a method of communicating using spread spectrum.

Referring now to FIG. 8, a method 800 is illustrated. The method 800 includes acts for communicating using spread spectrum. The method 800 includes receiving a spread signal, the spread signal having been formed by spreading a legacy RF signal (act 802). For example, FIG. 1 illustrates a spread signal 114 is received by a spread spectrum module 118. Similarly, FIGS. 5A and 5B illustrates a spread spectrum module 518 that can receive a spread signal.

The method 800 further includes performing spread spectrum processing on the spread signal to recover the legacy RF signal (act 804). For example, the spread spectrum modules 118 and/or 518 can process the spread signals (e.g., signal 114) to recover the legacy RF signal (e.g., signal 106). The legacy RF signal is later demodulated, potentially by legacy hardware, to obtain data in the legacy RF signal.

The method 800 may be practiced where receiving the spread signal comprises receiving the spread signal at a relay platform. In some such embodiments, the method further includes the relay platform wirelessly sending the legacy RF signal to a receiver. An example of this is illustrated at FIG. 1, where the relay platform 120 sends the legacy RF signal 106 to the receiver 104.

The method 800 may be practiced where receiving the spread signal comprises receiving the spread signal at a spread spectrum module coupled in a wired fashion to a receiver. The spread spectrum module performs the spread spectrum processing and the receiver demodulates the legacy RF signal.

The method 800 may be practiced where performing spread spectrum processing on the spread signal comprises using an acquisition marker included in the spread signal to process the spread signal.

The method 800 may be practiced where performing spread spectrum processing on the spread signal comprises performing frequency shifting on the spread signal. For example, this may be performed when the spread signal has been shifted by a transmitter as described previously herein.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general-purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of communicating using spread spectrum, the method comprising:

intercepting, by a spread spectrum module carried by a drone, a legacy radio frequency (RF) signal wirelessly transmitted from a legacy transmitter at a first node, the legacy transmitter being configured to wirelessly transmit the legacy RF signal to other nodes in a network, where the legacy RF signal is not a spread spectrum signal, wherein the legacy transmitter and the spread spectrum module are implemented as separate devices remote from each other;

performing, by the spread spectrum module, spread spectrum processing on the legacy RF signal to generate a spread spectrum signal; and wirelessly transmitting, by the spread spectrum module, the spread spectrum signal to a legacy receiver at a second node of the other nodes in the network to recover the legacy RF signal after the spread spectrum signal is de-spread by a de-spread spectrum module coupled to the legacy receiver.

2. The method of claim 1, wherein intercepting the legacy RF signal comprises wirelessly intercepting the legacy RF signal by the spread spectrum module.

3. The method of claim 1, wherein performing the spread spectrum processing on the legacy RF signal causes the spread spectrum signal to be below a predetermined noise floor.

4. The method of claim 1, wherein performing the spread spectrum processing on the legacy RF signal causes the spread spectrum signal to be suitable for use in a Code Division Multiple Access (CDMA) system.

5. The method of claim 1, further comprising adding an acquisition marker to the spread spectrum signal.

6. The method of claim 1, further comprising performing outphasing on the spread spectrum signal.

7. The method of claim 1, further comprising performing frequency shifting on the spread spectrum signal.

8. A method of communicating using spread spectrum, the method comprising:
receiving, by a de-spread spectrum module carried by a drone, a spread spectrum signal of a legacy radio frequency (RF) signal from a spread spectrum module;
performing, by the de-spread spectrum module, de-spread spectrum processing on the spread spectrum signal to recover the legacy RF signal; and
wirelessly providing the recovered legacy RF signal to a legacy receiver remote from the de-spread spectrum module, wherein the legacy receiver being a ground based receiver, and wherein the de-spread spectrum module, the spread spectrum module, and the legacy receiver are being implemented as separate devices remote from each other.

9. The method of claim 8, wherein providing the recovered legacy RF signal to the legacy receiver comprises wirelessly providing the recovered legacy RF signal at a relay platform by the de-spread spectrum module to the legacy receiver.

10. The method of claim 8, wherein providing the recovered legacy RF signal to the legacy receiver comprises wire providing the recovered legacy RF signal to the legacy receiver.

11. The method of claim 8, wherein performing the de-spread spectrum processing on the spread spectrum signal comprises using an acquisition marker included in the spread spectrum signal to process the spread spectrum signal.

12. The method of claim 8, wherein performing the de-spread spectrum processing on the spread spectrum signal comprises performing frequency shifting on the spread spectrum signal.

13. The method of claim 8, further comprising performing, by the de-spread spectrum module, notching cancellation to reduce effects of a jammer.

14. The method of claim 8, further comprising performing, by the de-spread spectrum module, interference cancellation to reduce effects of a jammer.

15. A drone carrying a spread spectrum module configured to communicate using spread spectrum, the spread spectrum module comprising:
circuitry configured to receive a legacy radio frequency (RF) signal wirelessly from a ground-based legacy transmitter which is physically separated from the spread spectrum module such that the spread spectrum module and the legacy transmitter are remote from each other;
an analog to digital converter configured to sample the received RF signal;
a pseudo noise code generator configured to generate pseudo noise codes;
a spread spectrum circuit configured to perform spread spectrum processing on the sampled RF signal to generate a spread spectrum signal based on the pseudo noise codes; and
an antenna configured to transmit the spread spectrum signal to a de-spread spectrum circuit of a drone carrying a second spectrum module, wherein the spread spectrum signal is de-spread by the de-spread spectrum circuit and send a de-spread spectrum signal to a legacy receiver to recover the legacy RF signal.

16. The drone carrying the spread spectrum module of claim 15, the spread spectrum module further comprising a pilot code generator configured to provide an acquisition marker to the spread spectrum signal.

17. The drone carrying the spread spectrum module of claim 15 wherein the spread spectrum module is a full duplex module.

18. The drone carrying the spread spectrum module of claim 15, the spread spectrum module further comprising a transceiver configured to transmit the spread spectrum signal to the de-spread spectrum circuit via the antenna.

19. The drone carrying the spread spectrum module of claim 15, the spread spectrum module further comprising a frequency shifter configured to perform frequency shifting on the spread spectrum signal.

* * * * *